(12) United States Patent
Volkov et al.

(10) Patent No.: US 8,275,492 B2
(45) Date of Patent: Sep. 25, 2012

(54) METHOD AND A SET OF MEANS FOR PILOTING AN AIRCRAFT

(75) Inventors: Gennady Ivanovich Volkov, Zhukovsky (RU); Yury Anatol'evich Za'tsev, Moscow (RU); Aleksandr Vasil'evich Koldaev, Moscow (RU); Aleksandr Ur'evich Kondrashina, Moscow (RU); Michail Vadimovich Korzhuev, Zhukovsky (RU); Yury Ivanovich Malov, Moscow (RU); Aleksandr Mikhaylovich Morzhin, Zhukovsky (RU); Valery Victorovich Podkidov, Zhukovsky (RU); Aleksandr Nikolaevich Pronin, Moscow (RU); Vladimir Alekseevich Savin, Moscow (RU)

(73) Assignee: IRKUT Corporation (RU)

(*) Notice: Subject to any disclaimer, the term of this patent is extended or adjusted under 35 U.S.C. 154(b) by 1011 days.

(21) Appl. No.: 12/065,843

(22) PCT Filed: Sep. 5, 2005

(86) PCT No.: PCT/RU2005/000451
§ 371 (c)(1),
(2), (4) Date: May 28, 2008

(87) PCT Pub. No.: WO2007/030028
PCT Pub. Date: Mar. 15, 2007

(65) Prior Publication Data
US 2009/0037032 A1    Feb. 5, 2009

(51) Int. Cl.
*G05D 1/00* (2006.01)

(52) U.S. Cl. ............... 701/2; 701/3; 244/3.11; 244/189; 244/197; 340/945

(58) Field of Classification Search .............. 701/1–3, 701/11, 14, 16; 244/3.11, 3.15, 76 R, 189, 244/190, 197, 220, 221; 434/31, 32; 340/945
See application file for complete search history.

(56) References Cited

U.S. PATENT DOCUMENTS

| | | | |
|---|---|---|---|
| 5,240,207 A * | 8/1993 | Eiband et al. ............... 244/190 |
| 5,785,281 A * | 7/1998 | Peter et al. ............... 244/190 |
| 5,890,441 A * | 4/1999 | Swinson et al. ............... 244/12.3 |
| 5,904,724 A * | 5/1999 | Margolin ............... 701/120 |
| 6,364,026 B1 * | 4/2002 | Doshay ............... 169/47 |
| 6,460,810 B2 * | 10/2002 | James ............... 244/194 |
| 6,739,556 B1 * | 5/2004 | Langston ............... 244/189 |
| 7,099,752 B1 * | 8/2006 | Lenell et al. ............... 701/2 |
| 2002/0030142 A1 * | 3/2002 | James ............... 244/194 |
| 2002/0107694 A1 * | 8/2002 | Lerg ............... 704/273 |
| 2003/0093193 A1 * | 5/2003 | Pippenger ............... 701/3 |
| 2003/0130770 A1 * | 7/2003 | Matos ............... 701/3 |
| 2003/0206102 A1 * | 11/2003 | Joao ............... 340/539.1 |
| 2004/0078122 A1 * | 4/2004 | Pippenger ............... 701/3 |

(Continued)

*Primary Examiner* — Thomas G. Black
*Assistant Examiner* — Ce Li
(74) *Attorney, Agent, or Firm* — Baker & McKenzie LLP

(57) ABSTRACT

The present disclosure relates to a method and a set of means for piloting an aircraft used, first of all, for detecting emergency situations and for removing the consequences thereof, which make it possible perform all possible control modes for piloting the same aircraft in the form of an aircraft hand-flown by a pilot with the aid of flight control means, an aircraft remotely flown by instructions of a control station technical means and an independent automated aircraft flown by instructions of the aircraft equipment. In order to carry out the remote, automatic and independent control of the aircraft, the power drive units of control equipment, a system for the switch-on and off thereof and technical supporting means are provided on the aircraft board and on the control station.

8 Claims, 2 Drawing Sheets

U.S. PATENT DOCUMENTS

2004/0093130 A1* 5/2004 Osder et al. ............... 701/3
2004/0193334 A1* 9/2004 Carlsson et al. ............ 701/9
2005/0065667 A1* 3/2005 Weineck .................... 701/3
2006/0032978 A1* 2/2006 Matos et al. ............ 244/118.5
2006/0249625 A1* 11/2006 Matos .................... 244/118.5

* cited by examiner

METHOD AND A SET OF MEANS FOR PILOTING AN AIRCRAFT

BACKGROUND

The present disclosure relates to means for piloting an aircrafts, designed first of all to detect emergency situations caused by natural or anthropogenic reasons and mitigation of consequences thereof. Means for monitoring and control as well as means for elimination of emergency situations (e.g. water for firefighting) are used as a payload of such aircraft.

The present disclosure is particularly actual when using aircrafts for timely detection of emergency situations and arranging actions aimed at elimination of consequences for the purpose of saving peoples' lives and health, decreasing damage to property and preventing contamination of the environment.

TECHNICAL ART

There is a known method and complex of standard means for driving the firefighting plane designed to detect the seat of fire and pour out water over it according to the U.S. Pat. No. 5,878,819.

There is a known method and complex of standard means for driving the firefighting hydroplane capable of filling water from the surface of water body and pour it out over the seat of fire according to the Patent of Russia No. 2,174,934.

The analogue of the disclosure is a complex of means for operating unmanned aircrafts designed for detecting and eliminating emergency situation caused by fire as per U.S. Pat. No. 6,364,026.

It includes unmanned monitoring aircraft, unmanned firefighting aircrafts and a ground remote piloting station with a human operator.

A forerunner to the present disclosure according to the number and content of similar features is an aircraft control system as per U.S. Pat. No. 5,240,207, in which standard means for aircraft control are converted into means for remote piloting through an on-ground piloting station, which transformed a manned plane into unmanned aircraft.

The prototype system includes an aircraft with platforms installed in its cabin, which are connected by power cables to the control equipment designed to control the aircraft, a first video camera to record the image of the information and control field of the cabin, second video camera to record the image outside the cabin and a combined radio equipment to connect to the control station.

The aircraft control station is equipped with the aircraft control equipment support hardware, adapted to receive and display video image from the first and the second cameras as well as to produce and transmit the aircraft remote control commands.

In the mentioned prototype the image of the information and control field of the aircraft cabin, received from the first video camera and information on conditions of the surrounding airspace and the ground, received from the second video camera, are transmitted to the control station and displayed on the monitor. The control station operator analyses this information, chooses and executes the control commands, which are further transmitted aboard the aircraft and activate the power drives of the controlling equipment to make the aircraft perform the required actions. This control process repeats iteratively during the flight of the aircraft.

The aircraft control system as per U.S. Pat. No. 5,240,207 has only one mode implemented: remote piloting by the control station operator. Automatic control of the aircraft is not provided. Accomplishing piloted flight mode requires the construction of the aircraft to be restored back to the initial state, i.e. dismantling all additional control facilities. This makes piloting this aircraft impossible.

Such way of piloting the aircraft might be quite limited or unacceptable at all in the conditions of poor visibility, due to smoke, fog or cloudiness.

SUMMARY

The present disclosure, according to some embodiments, solves the problem of piloting the aircraft in all possible piloting modes: when piloted by pilot with the use of standard control facilities, when piloted remotely by the control station operator, in automatic mode upon commands from technical facilities of the control station and in free-running automatic mode upon commands of the on-board radio-electronic equipment of the aircraft.

In order to allow remote, automatic and free-running automatic piloting of the aircraft, the power drives of the controlling equipment are installed, turn on and shut down systems are implemented as well as hardware and software means for support onboard the aircraft and at the control station. Any of the piloting modes can be turned on or off repeatedly during a single flight by the pilot, or remotely by the control station operator, or automatically without any structural alterations of the aircraft and without damage to its further operation in other piloting modes.

The disclosed complex (a set of means) includes:
  aircraft with a cabin which contains piloting equipment for controlling operation of the aircraft;
  platforms installed in the cabin of the aircraft near the control equipment intended for piloting the aircraft;
  power drives connected to the piloting equipment and to the platforms with a movable joint;
  power drive control system;
  control station removed from the aircraft, which includes technical means for support of control equipment onboard the aircraft, adapted to receive and process instrumental readings, sensors and conditions of the controlling equipment of the aircraft as well as to generate and transmit aircraft control signals;
  means for generating signals describing instrumental readings, sensors and condition of the control equipment of the aircraft, installed onboard the aircraft;
  transmitting and receiving radio-electronic equipment installed onboard the aircraft designed for transmitting signals describing instrumental readings, sensors and conditions of the control equipment of the aircraft to the control station, as well as receiving control commands from the station;
  means for receiving and processing signals related to instrumental readings, sensors and conditions of control equipment of the aircraft at the control station using receiving and transmitting equipment;
  means for generating aircraft control signals at the control station;
  means for multiple transmission of aircraft piloting signals generated at the control station, to the power drive control system onboard the aircraft in such a way that deviation and orientation of the piloting equipment onboard the aircraft corresponds to the commands of control station support hardware to allow the aircraft performing the required operations.

The disclosed complex (a set of means) additionally contains:

controlled means for connecting power drives to the control equipment of the aircraft;

means for turning on and turning off the controlled means for connecting the power drives to the control equipment of the aircraft with the possibility to be activated by the pilot in the piloted mode, or operator at the control station remotely and automatically with the use of technical equipment located aboard the aircraft and at the control station;

an on-board computer to implement the remote piloting mode, automatic and off-line automatic modes of piloting the aircraft;

interface signal and command input/output device installed onboard the aircraft between the computer and the sensors, devices and power drives control system;

satellite radio navigation system equipment installed onboard the aircraft for precise positioning of the aircraft;

navigation and landing system equipment installed at the control station.

The disclosed complex of means for piloting the aircraft may have the controlled means for joining power drives with the control equipment of the aircraft implemented in the form of mechanical devices, particularly in the form of clutches.

The disclosed complex of means for piloting the aircraft may have a control station installed on a stationary or mobile platform.

The disclosed complex of means for piloting the aircraft may have a control station installed on a marine stationary or mobile platform.

The disclosed complex of means for piloting the aircraft may have a control station installed on a stationary or mobile aerial platform.

The disclosed complex of means for piloting the aircraft may have a control station installed on a space platform.

BRIEF DESCRIPTION OF THE DRAWINGS

Hereinafter the present disclosures shall be illustrated by particular examples of implementation with references to the attached drawings which include.

DETAILED DESCRIPTION

Figure 1:
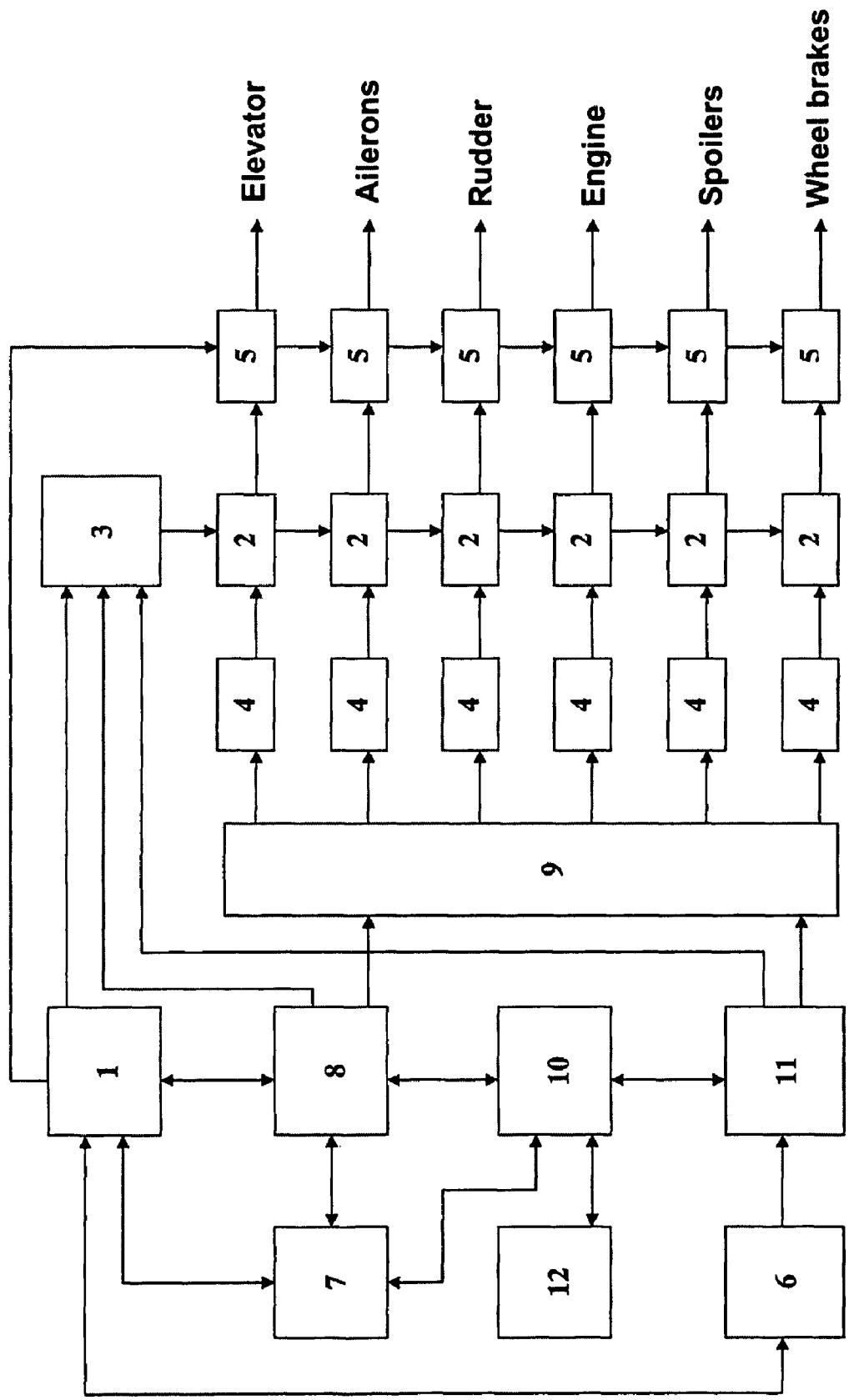
FIG. 1—Block diagram of board equipment of the aircraft.

When in manned aircraft piloting mode involving pilot (1) (FIG. 1), the controlled joints (2) with the help of activators and deactivators (3), disconnect the power drives from the control equipment (5). The pilot (1) directly operates the control equipment (5) using standard devices, sensors and equipment (6). The pilot (1) can independently control the payload (7) and transmit the data received with the help of it to the control station using means for radio communication (8). Payload (7) can be controlled by the operator and hardware of control station using means for radio communication (8).

When the aircraft is controlled by the control station operator in remote piloting mode, the controlled joints (2) connect to the control equipment (5) to the power drives (4) with the help of activators and deactivators (3) (FIG. 1). The control commands from the control station operator arrive via the means for radio communication (8) to the power drives control system (9) activating the control equipment (5) through power drives (4) and controlled joints (2) to allow the aircraft to perform the required actions. The onboard computer 10 processes data related to standard equipment, sensors and equipment (6) received through command and signals input/output interface device (11) as well as signals received directly from the receiver of the satellite radio navigation system (12), which are further transmitted via means for radio communication (8). Information related to precise coordinates of the aircraft location, received at the control station, information related to the spatial location and motion characteristics as well as data related to instrumental readings, sensors and condition of the onboard equipment is analyzed by the operator for repeated generation and transmission of the required control commands to the aircraft. The payload (7) is controlled by the control station operator.

When in automatic aircraft piloting mode, the controlled joints (2) connect power drives (4) to the control equipment (5) (FIG. 1) using activators and deactivators (3) upon commands of control station hardware. The control commands from the control station hardware are received via the means for radio communication (8) to the power drives control system (9) activating the control equipment (5) through power drives (4) and controlled joints (2) to allow the aircraft to perform the required actions. In order to generate the control commands, the hardware of the control station uses data related to location, position and motion of the aircraft as well as conditions of its equipment, received in the way similar to the case of remote control. The payload (7) is controlled by the control station operator or by the aircraft hardware according to the program entered before or during the flight.

When in free-running remote aircraft piloting mode, the controlled joints (2) connect the power drives (4) to the control equipment (5) (FIG. 1) upon commands of the onboard radio-electronic equipment using activators and deactivators (3). The control commands are generated by the onboard computer (10) according to the entered flight program. They are further transmitted to the power drives control system (9) through a commands and signals input/output interface device (11), activating the control equipment (5) by power drives (4) and controlled joints (2) to allow the aircraft perform the required operations. Readings of standard devices, sensors and equipment (6) received via the input/output interface device (11) as well as signals of the satellite radio navigation system receiver (12), arriving directly to the onboard computer (10), are used as source data for generating control commands of the onboard computer (10). They allow the onboard computer (10) to determine the coordinates of precise location of the aircraft, its spatial position, dynamic characteristics and condition of the equipment. In case if this information differs from the flight task entered into onboard computer (10), the appropriate commands of correction of position and aircraft movement are generated. The payload is controlled by the control station operator or by the aircraft hardware according to the program entered before or during the flight.

The aircraft control modes can be repeatedly changed by effecting the activators and deactivators (3) of the controlled joints (2) of the operator (1), by the control command of the control station operator received via means for radio communication (8) and the control commands of the onboard computer (10) received through the input/output interface device (11).

The control station includes the aircraft operator's workplace (13) (FIG. 2), payload operator's workplace (14), computer system (15), visualization tools (16), means for data receipt and transmission (17), landing and navigation system equipment (18), airfield communication and intercom systems (19) and supply system (20).

Figure 2:
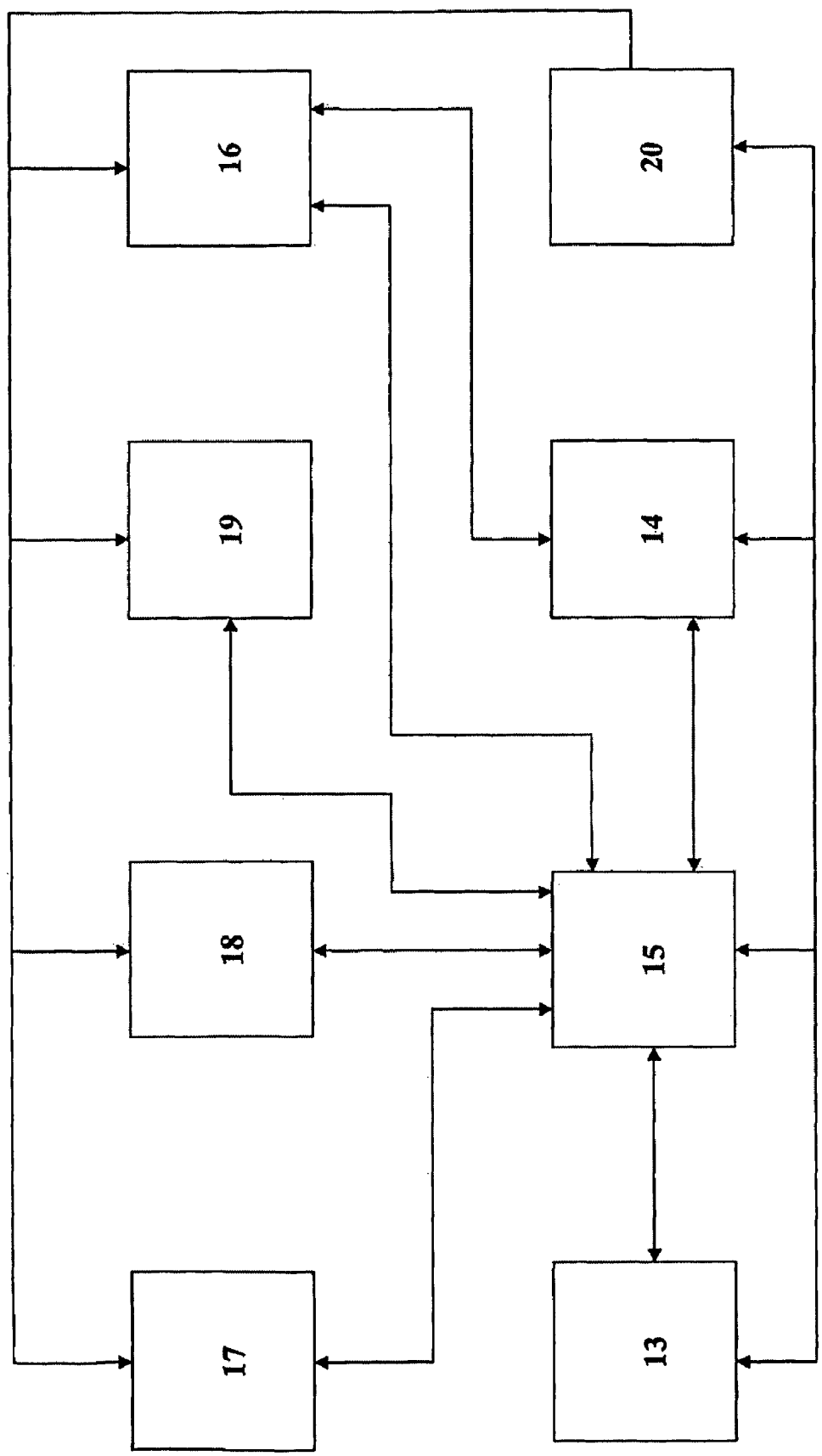
FIG. 2—Control station block diagram.

When in manned mode the aircraft operator of the control station does not directly take part in the piloting. He can control the readings of the standard onboard devices, sensors and equipment transmitted to the means for data receipt and transmission (17), processed by the computer system (15) and displayed on the monitors of the aircraft operator's workspace (13) and visualization tools (16) (FIG. 2). The aircraft control station can issue a command to switch to remote manned mode, automatic mode or free-running automatic mode. The payload operator can control the means for payload installed onboard of the aircraft from his workplace 14 via computer system 15 and data receiving and transmitting system 17. He can receive and analyze information from the payload via the same data exchange channel, which is displayed on the monitors of the payload operator's workplace 14 and visualization tools 16.

When in remote piloting mode the control station aircraft operator receives all the necessary information related to readings of the onboard standard instruments, sensors and equipment, precise coordinates of the aircraft location, its spatial position and dynamic characteristics, to the monitors of his workplace 13. Based on the analysis of this data and according to the flight task he issues appropriate piloting commands which are processed by the computer system (15) and transmitted onboard the aircraft using data exchange facilities (17). The payload operator issues payload control commands from his workplace (14) via the computer system (15) and using means for data exchange (17), and receives and analyzes the arriving information (FIG. 2).

When in automatic aircraft piloting mode, the received data related to the readings of standard onboard devices, sensors and equipment, precise location coordinates and spatial positioning, dynamic characteristics, is constantly processed in the computer system and compared to the flight task data upon commands received from the control station hardware. In case of any deviations detected, the corresponding control commands are issued, which are transmitted onboard the aircraft via data exchange equipment (17) (FIG. 2). The control station aircraft operator does not directly take part in piloting. However, he has a possibility to control the flight from his workplace (13) and, if needed, change active flight task or change the aircraft control mode, e.g. take manual control of the aircraft. Similarly to the previous cases, the payload is controlled by the payload operator from his workplace (14) via computer system (15) and means for data exchange (17). He also receives and analyzes the information arriving from those (FIG. 2).

When in free-running automatic aircraft piloting mode the aircraft operator receives all necessary information related to indications of the standard onboard devices, sensors and equipment, precise aircraft positioning coordinates, spatial location and dynamic characteristics on his workplace (13) upon commands of his radio-electronic equipment. If necessary, he can change the flight task program or aircraft piloting mode. The payload operator receives information from the payload on his workplace (14). They can be operated upon commands from the onboard computer of the aircraft as well as upon payload operator's commands. The aircraft is landed in manned mode by the pilot using standard piloting equipment. When in remote piloting or automatic piloting modes, the approach and landing commands are generated using navigation and landing equipment (18) at the control station (FIG. 2). They are transmitted onboard the aircraft and are executed in the same way as the flight control commands.

Airfield communication and intercom systems (19) (FIG. 2) ensure radio communication between the aircraft operator, payload operator, aircraft and control station maintenance staff, airfield services and flight dispatcher, as well as the management of the operation aimed at detection of emergency situations and elimination of consequences thereof, in which the aircraft is involved.

The power supply system (20) (FIG. 2) provides power to the whole equipment of the control station involving the airfield power network, offline generator and battery-based UPS units.

INDUSTRIALLY APPLICABLE

The present disclosure is designed for piloting aircrafts used mainly for detecting emergency situations and eliminating consequences thereof. Each of the means stipulated by the present disclosure is produced by the industries of different countries. Interaction of means provided for by the present disclosure is realized in known general-purpose processes.

In the "Irkut" Corporation the embodiments of the present disclosure are realized in the form specific for the Emergency Situations Ministry of Russia. The aircraft is manufactured on the basis of (5) modified two-seater motor glider S10-VT (produced by Stemme, Germany) implemented under the single-beam diagram with a two-piece wing if high aspect ratio and T-shaped tail assembly. A 115 h.p. ROTAX 914 engine is used as a power drive. A tricycle-equipped landing gear with a tail wheel is used. Main landing gears are retracted inside the fuselage.

Piloting in the roll channel is performed by ailerons, track piloting is ensured by the yaw rudder located at the fin, longitudinal control is executed by the elevators positioned at the tail assembly. Rudders are deflected by handles and pedals installed inside the cabin, through dragging poles.

The left seat of the motor glider is used by the pilot for manned piloting. Remote and automatic control equipment is installed in the cabin in place of the dismounted right seat. The mentioned equipment includes controlled joints, activators and deactivators as well as power drives dynamically connected to the control equipment (handles and pedals) and to the platforms, which are implemented in the form of rigid bearing supports of the structure.

Antennas and radio communication facilities are installed on the surface of the modified glider.

Standards devices, sensors and equipment of the modified motor glider include flight controls (airspeed indicator, altimeter, magnetic compass) and engine controls (tachometer, pressure and oil temperature indicator, cylinder head temperature indicator, voltmeter, ammeter, fuel gage and engine life indicator).

To maintain automatic and free-running piloting modes, a compact inert system is used as a coordinate sensor, careen, pitch, course, track angle, vertical velocity, overloads and angular velocities, as well as air signals sensor system as a sensor of meter velocity and relative barometric altitude.

Hydro-stabilized optoelectronic system and radio location stations installed in suspension containers under the wing of the modified motor glider, are used as payload.

The ground station is made in the in the mobile variant on the basis of automobile ZIL 5301 It includes air conditioning system, power supply system, workspaces of the operator of the aircraft and payload operator, computer system, visualization tools, navigation and landing system equipment as well as data exchange facilities, including antenna-feeder system.

The created aviation complex allows to realize all the possible piloting modes with the mentioned motor glider: manned mode with standard means for piloting, remote piloting by the control station operator, automatic piloting upon commands of control station hardware and free-running automatic upon commands of the onboard equipment of the aircraft.

This mode and the aircraft piloting complex were described with the reference to the examples of actual implementation, depicted on FIG. 1 and FIG. 2. This present disclosure may be implemented in other modifications and with other supplements, not going beyond the scope and sphere of the claims, which consists in the following.

The invention claimed is:

1. A method for piloting an airborn aircraft in cooperation with a remote control station,
  wherein the aircraft comprises:
    aircraft piloting equipment for controlling operation of the aircraft;
    power drives;
    controlled joints having
      a first mode in which the controlled joints operably connect the aircraft piloting equipment to the power drives and
      a second mode in which the controlled drives disconnect the aircraft piloting equipment from the power drives;
    activators and deactivators operable to switch the controlled joints from the first mode to the second mode and operable to switch the controlled joints from the second mode to the first mode;
    a power drive control system operable to control the power drives;
    aircraft radio communication equipment;
    an on-board computer;
    a commands and signals input/output interface device;
    a satellite radio navigation system receiver; and
    instruments and sensors, and
  the remote control station comprises:
    control station radio communication equipment;
    control station hardware;
    a navigation and landing system,
  the method comprising:
    (a) receiving data related to devices, sensors, and control equipment through the command and signals input/output interface device;
    (b) receiving signals directly from the satellite radio navigation system
    (c) processing the data and signals to produce processed data and signals selected from the group consisting of precise coordinates of the aircraft location, spatial location and motion characteristics, instrumental readings, sensors and condition of the onboard equipment, and combinations thereof;
    (d) transmitting the processed data and signals through the aircraft radio equipment;
  in a remote piloting mode:
    (e) operating the activators and deactivators to switch the controlled joints to the first mode;
    (f) receiving the processed data and signals through control station radio communication equipment
    (e) conveying the processed data and signals to a control station operator
    (g) generating control station operator commands;
    (h) transmitting the control station operator commands with the control station radio communication equipment;
    (i) receiving the control station operator commands from the remote control station with the aircraft radio communication equipment;
    (j) conveying the control station operator commands from the aircraft radio equipment to the power drive control system, wherein the power drive control system activates the control equipment in accordance with the control station operator commands through power drives and controlled joints;
    (k) repeating (a), (b), (c), (d), (e), (f), (g), (h), (i) (j) or combinations thereof;
  in an automatic aircraft piloting mode:
    (l) operating the activators and deactivators to switch the controlled joints to the first mode upon commands of control station hardware;
    (m) receiving the processed data and signals through control station radio communication equipment;
    (n) conveying the processed data and signals to the control station hardware;
    (o) generating control station hardware commands using the processed data and signals;
    (p) transmitting the control station hardware commands with the control station radio communication equipment;
    (q) receiving the control station hardware commands from the remote control station with the aircraft radio communication equipment;
    (r) conveying the control station hardware commands from the aircraft radio equipment to the power drive control system, wherein the power drive control system activates the control equipment in accordance with the control station hardware commands through power drives and controlled joints;
    (s) repeating (a), (b), (c), (d), (l), (m), (n), (o), (p), (q), (r) or combinations thereof;
  in a free-running automatic aircraft mode:
    (t) operating the activators and deactivators to switch the controlled joints to the first mode;
    (u) generating onboard computer commands using the processed data and signals;
    (v) conveying the onboard computer commandsto the power drive control system through the commands and signals input/output interface device, wherein the power drive control system activates the control equipment in accordance with the onboard computer commands through power drives and controlled joints;
    (w) repeating (a), (b), (c), (d), (t), (u), (v) or combinations thereof; and
  in the remote piloting mode or the automatic aircraft piloting mode:
    (x) optionally landing the aircraft comprising:
      (i) generating landing commands through the navigation and landing system;
      (ii) transmitting the landing commands with the control station radio communication equipment;
      (iii) receiving the landing commands from the remote control station with the aircraft radio communication equipment;
      (iv) conveying the landing commands from the aircraft radio equipment to the power drive control system, wherein the power drive control system activates the control equipment in accordance with the control station hardware commands through power drives and controlled joints, wherein the aircraft is landed.

2. A method for piloting an airborn aircraft in cooperation with a remote control station according to claim 1, wherein the controlled joints comprise electronic clutches.

3. A method for piloting an airborn aircraft in cooperation with a remote control station according to claim 1, wherein the remote control station further comprises a stationary terrestrial platform or a mobile terrestrial platform.

4. A method for piloting an airborn aircraft in cooperation with a remote control station according to claim 1, wherein the remote control station further comprises a stationary marine platform or a mobile marine platform.

5. A method for piloting an airborn aircraft in cooperation with a remote control station according to claim 1, wherein the remote control station further comprises a stationary aerial platform or a mobile aerial platform.

6. A method for piloting an airborn aircraft in cooperation with a remote control station according to claim 1, wherein the remote control station further comprises a space platform.

7. A method for piloting an airborn aircraft in cooperation with a remote control station according to claim 1 further comprising generating a command to switch between the piloting modes through the on-board computer or through the control station hardware.

8. A method for piloting an airborn aircraft in cooperation with a remote control station according to claim 1 further comprising:

in a manned mode:
- (y) operating the activators and deactivators to switch the controlled joints to the second mode;
- (z) generating onboard operator commands;
- (aa) conveying the onboard operator commandsto the control equipment; and
- (bb) repeating (a), (b), (c), (d), (y), (z), (aa) or combinations thereof.

* * * * *